US012792460B2

(12) United States Patent
Guan et al.

(10) Patent No.: US 12,792,460 B2
(45) Date of Patent: Nov. 10, 2026

(54) PERFORMING SELECTIVE MEDIA MANAGEMENT OPERATIONS IN A MEMORY SUB-SYSTEM

(71) Applicant: Micron Technology, Inc., Boise, ID (US)

(72) Inventors: Yu Long Guan, Shanghai (CN); Shi Bo Zhang, Shanghai (CN); Xin Lv, Shanghai (CN); Chenjie Zhou, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 108 days.

(21) Appl. No.: 18/829,830

(22) Filed: Sep. 10, 2024

(65) Prior Publication Data

US 2026/0072782 A1 Mar. 12, 2026

(51) Int. Cl.
*G06F 11/10* (2006.01)

(52) U.S. Cl.
CPC ...... *G06F 11/1016* (2013.01); *G06F 11/1048* (2013.01); *G06F 11/1068* (2013.01)

(58) Field of Classification Search
CPC ... G06F 11/1016; G06F 11/1068; G06F 11/48
See application file for complete search history.

(56) References Cited

U.S. PATENT DOCUMENTS

| | | | | |
|---|---|---|---|---|
| 10,867,683 | B2 * | 12/2020 | Shim | G06F 11/1048 |
| 11,740,805 | B2 * | 8/2023 | Malshe | G06F 3/064 714/710 |
| 12,009,047 | B2 * | 6/2024 | Shyvers | G11C 29/10 |
| 2016/0103630 | A1 * | 4/2016 | Shen | G06F 11/008 714/37 |
| 2016/0179386 | A1 | 6/2016 | Zhang | |
| 2021/0149753 | A1 | 5/2021 | Tanakamaru | |
| 2021/0334030 | A1 | 10/2021 | Yang et al. | |
| 2022/0027062 | A1 * | 1/2022 | Muchherla | G06F 12/0246 |
| 2022/0301637 | A1 * | 9/2022 | Tehrani | G11C 7/1045 |
| 2023/0229325 | A1 | 7/2023 | Malshe | |

OTHER PUBLICATIONS

International Search Report and Written Opinion for International Application No. PCT/US2025/044735, mailed Jan. 6, 2026, 09 Pages.

* cited by examiner

*Primary Examiner* — Cynthia Britt
(74) *Attorney, Agent, or Firm* — Lowenstein Sandler LLP

(57) ABSTRACT

A system comprising a memory device and a processing device, the processing device operatively coupled with the memory device to perform operations. The processing device detects a trigger for a media management operation associated with a block of the memory device, wherein the block comprises a plurality of wordlines (WLs). The processing device identifies a first subset of the plurality of WLs, wherein the first subset of the plurality of WLs fails to satisfy a reliability threshold criterion. The processing device performs the media management operation on a set of memory cells associated with the first subset.

17 Claims, 4 Drawing Sheets

PERFORMING SELECTIVE MEDIA MANAGEMENT OPERATIONS IN A MEMORY SUB-SYSTEM

TECHNICAL FIELD

Embodiments of the disclosure relate generally to memory sub-systems, and more specifically, relate to performing selective media management operations in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
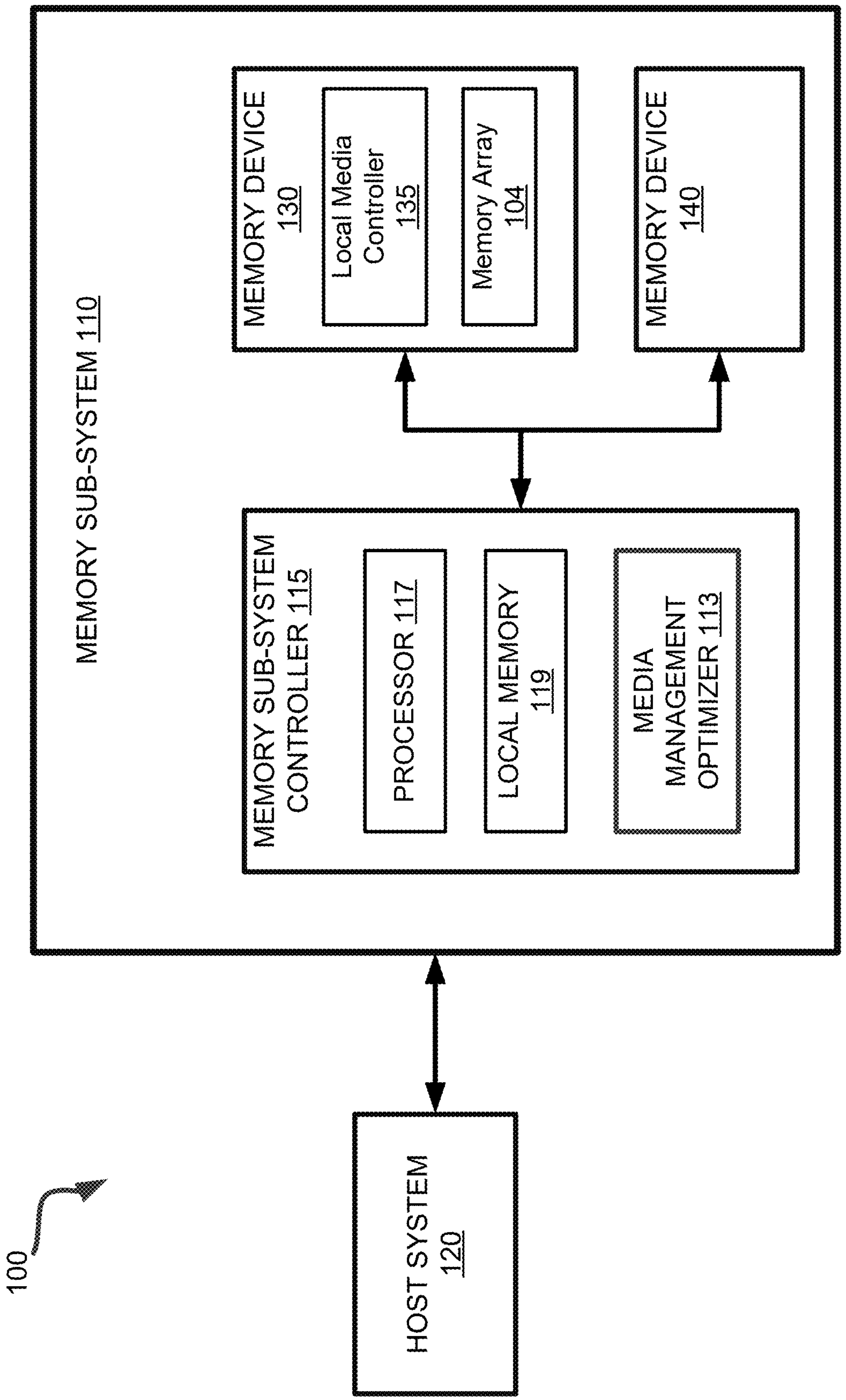
FIG. 1 illustrates an example computing system that includes a memory sub-system in accordance with some embodiments of the present disclosure.

Aspects of the present disclosure are directed to performing selective media management operations in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells can be formed onto a silicon wafer in an array of columns and rows. A bitline can refer to one or more conductive lines coupled to a column of associated memory cells in a memory device. A wordline can refer to one or more conductive lines coupled to a row of associated memory cells in a memory device that are used with one or more bitlines to generate the address of each of the memory cells. The intersection of a bitline and a wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes and across multiple dies (i.e., in block stripes). Accordingly, one request to read a segment of data (e.g., corresponding to one or more data addresses), can result in read operations performed on two or more of the memory planes of the memory device.

Read disturb (RD) is a phenomenon that can occur in memory devices, where reading data from memory cells associated with a given wordline impacts the threshold voltages of memory cells associated with unselected wordlines of the same block or other segment of the memory device. When reading a page from one or more memory cells, a read voltage is applied to the associated selected wordline. This voltage can cause electrons to migrate to memory cells associated with one or more other wordlines adjacent to the selected wordline unintentionally, which can compromise data integrity and cause errors during read operations since the memory cells no longer accurately represent the data they were meant to hold. If the changes in the neighboring cells are significant enough, this can lead to data corruption or bit errors in those cells. This is referred to as a "read disturb" error. The risk of read disturb increases with the number of read functions performed, which can result in read errors and higher latency from a high read error handling trigger rate.

To prevent read disturb errors, management techniques are employed. One such management technique is read disturb detection. Read disturb detection is a feature that relies on scans of the memory cells associated with randomly-selected wordlines to detect degradation from reading and screen out blocks with a certain number of memory cells suffering from read disturb. Read disturb detection can be performed through a scan (e.g., a NAND detect empty page (NDEP) scan for NAND devices), hereafter referred to as a "read disturb scan," which is a procedure performed on the memory device to identify or measure if memory cells have been affected by read disturb.

In a conventional RD management technique, upon detecting a trigger such as a RD scan failure of a block, the system performs a media management operation on the block suffering from RD (i.e., the "victim block"). The memory cells of the victim block are read and subsequently written into an unprogrammed, available block. The system then typically concludes the media management operation by erasing the victim block.

However, performing the media management operation across an entire block entails performing the media management operation (e.g., reading, writing, folding, etc.) on memory cells associated with every wordline of the block. In some embodiments, this operation extends across a block stripe spanning multiple dies. Implementing such a widespread operation introduces unnecessary latency. This causes a significant decrease in input-output per second (IOPS) and can be detrimental in implementations where performance is paramount.

Aspects of the present disclosure address the above and other deficiencies by performing selective media management operations in the memory sub-system. Specifically, media management operations can be only performed on wordlines that fail to meet a reliability threshold criterion. In some embodiments, the media management operation is triggered by a block's failure of an RD scan. Once the media management operation is triggered, the system identifies one or more wordlines (of the wordlines associated with the block) where the associated memory cells fail to satisfy a reliability threshold criterion. In some embodiments, this reliability threshold criterion is a maximum raw bit error rate (RBER). RBER refers to the number of bit errors that occur during the process of reading a total number of bits of memory prior to the application of any error correcting operations (e.g., error correcting code (ECC)). In some embodiments, the one or more failing wordlines are identified as the system iterates through the wordlines of the block (or block stripe). In some embodiments, as each wordline is identified, the system marks the wordline in a metadata table. After the system has identified all the wordlines that fail to meet the reliability threshold criterion, it performs the media management operation on only those wordlines. In some embodiments, the system refers to the metadata table to target each wordline.

Advantages of the present disclosure include, but are not limited to, improved latency, improved IOPS, and improved reliability. By selectively performing media management operations on wordlines that fail to meet specified reliability threshold criteria, system bandwidth is conserved, allowing for the allocation of resources to other operations. This targeted approach improves the reliability of the memory device by managing wordlines that can cause RD errors, but also avoids inefficiencies associated with broader media management strategies that perform media management operations across an entire block or block-stripe.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array.

Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media management optimizer component 113 that can perform selective media management operations. In some embodiments, the memory sub-system controller 115 includes at least a portion of the media management optimizer component 113. In some embodiments, the media management optimizer component 113 is part of the host system 120, an application, or an operating system. In other embodiments, local media controller 135 includes at least a portion of media management optimizer component 113 and is configured to perform the functionality described herein.

The media management optimizer component 113 can perform selective media management operations on wordlines that fail to meet a reliability threshold criterion. In some embodiments, a media management operation is triggered by a block of memory device 130 failing a RD scan. Once the media management operation is triggered, the media management optimizer component 113 identifies one or more wordlines (of the wordlines associated with the block) where the associated memory cells fail to satisfy a reliability threshold criterion. In some embodiments, this reliability threshold criterion is a maximum raw bit error rate (RBER). In some embodiments, as each wordline is identified, the media management optimizer component 113 marks the wordline in a metadata table (e.g., stored in local memory 119). After the media management optimizer component 113 has identified all the wordlines that fail to meet the reliability threshold criterion, it performs the media management operation on only those wordlines. In some embodiments, the media management optimizer component 113 refers to the metadata table to target each wordline. Further details with regards to the operations of the media management optimizer component 113 are described below.

Figure 2:
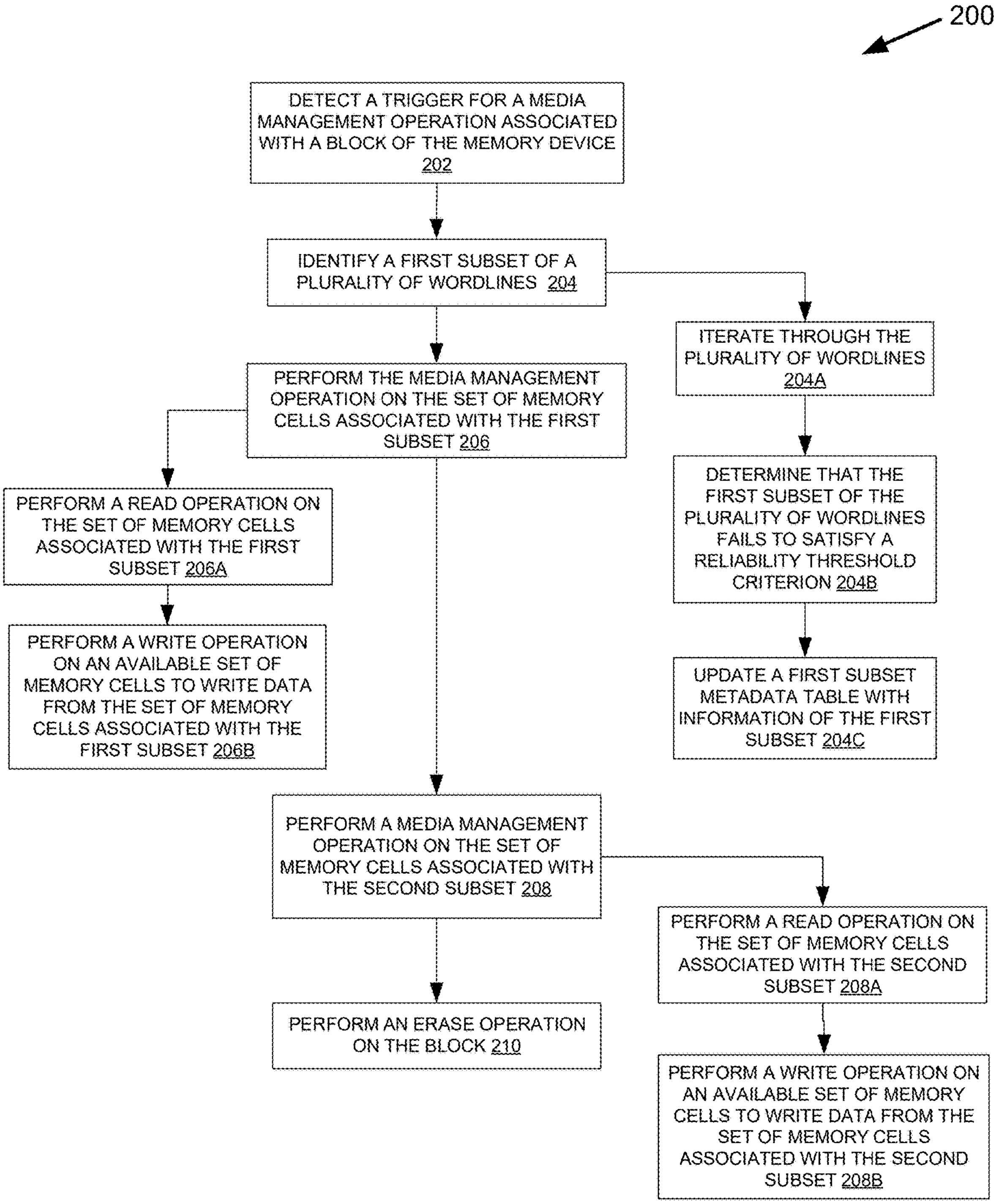
FIG. 2 illustrates an example method to perform a selective media management operation, in accordance with some embodiments of the present disclosure.

FIG. 2 is a flow diagram of an example method 200 to perform selective media management operations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the media management optimizer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic (e.g., the media management optimizer component 113) detects a trigger for a media management operation associated with a block of a memory device, wherein the block comprises a plurality of WLs. In some embodiments, the trigger for the media management operation comprises determining that the block fails to satisfy a read disturb (RD) scan. As mentioned, RD detection can be performed through a scan (e.g., a NAND detect empty page (NDEP) scan for NAND devices), which is a procedure performed on a block to identify or measure if the associated memory cells have been affected by read disturb. In some embodiments, an RD scan involves scans of the memory cells associated with randomly-selected wordlines to detect degradation from reading and screen out blocks with a threshold number of memory cells suffering from read disturb.

At operation 204, the processing logic identifies a first subset of the plurality of WLs, wherein the first subset of the plurality of WLs fails to satisfy a reliability threshold criterion. In some embodiments, a "subset" can comprise multiple WLs, where all WLs either uniformly fail to meet the reliability threshold criterion or uniformly satisfy it. In some embodiments, the set of memory cells is part of a block stripe, wherein the block stripe comprises a logical group of blocks across a plurality of dies.

In some embodiments, the reliability threshold criterion is a maximum raw bit error rate (RBER). RBER is a reliability metric that measures the frequency of errors in data and is defined as the ratio of erroneous bits to the total number of bits read from the memory. A high RBER indicates a higher occurrence of bit errors, posing challenges to error correction mechanisms in maintaining data integrity. In some embodiments, a subset satisfying the reliability threshold criterion entails a WL having an RBER less than or equal to the maximum acceptable RBER. In some embodiments, a subset failing to satisfy the reliability threshold criterion entails a WL having an RBER exceeding the maximum acceptable RBER value. A WL failing to satisfy the reliability threshold criterion indicates a WL causing a higher occurrence of bit errors, posing challenges to error correction mechanisms in maintaining data integrity for the memory device. In some embodiments, the maximum RBER value is predetermined by the host.

Figure 3:
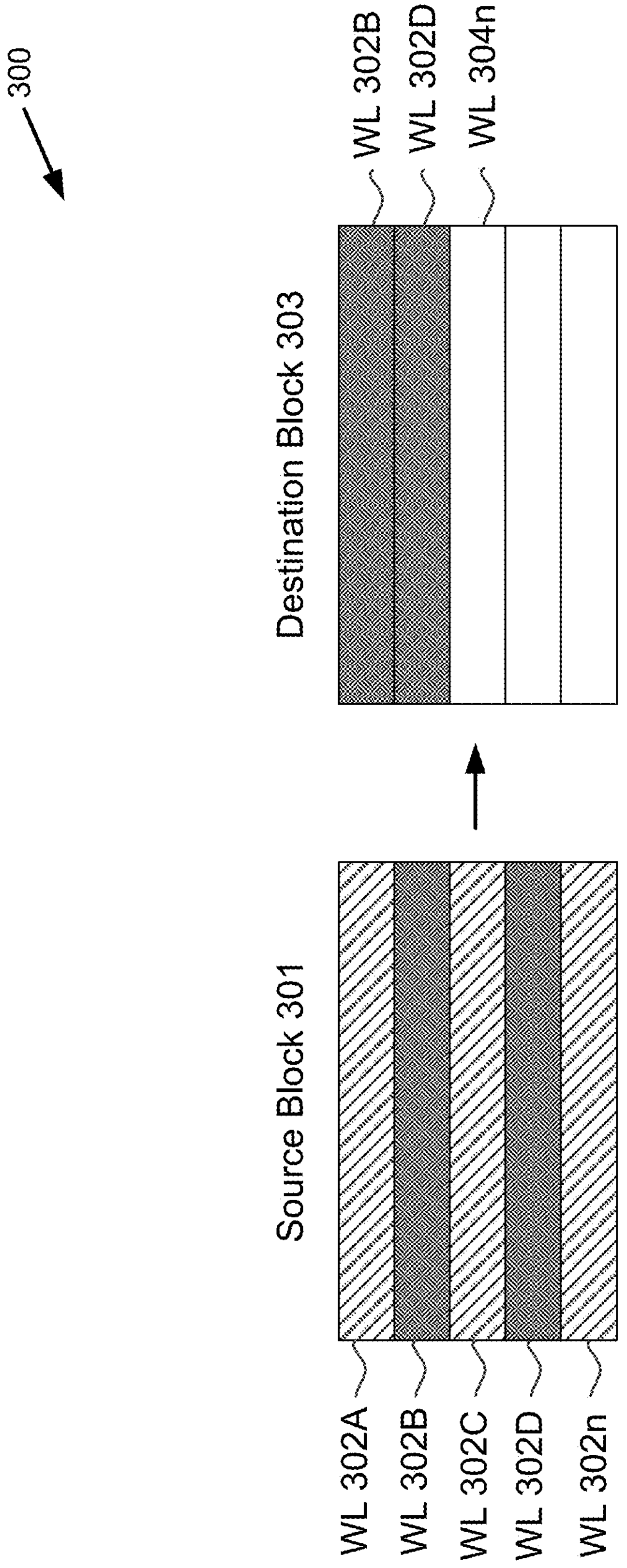
FIG. 3 is a flow diagram of an example method to perform a selective media management operation, in accordance with some embodiments of the present disclosure.

At operation 204A, in identifying the first subset of the plurality of WLs, the processing logic, in some embodiments, iterates through the plurality of WLs of the block (e.g. those wordlines shown in FIG. 3). FIG. 3 is a diagram 300 illustrating an example method to perform a selective media management operation, in accordance with some embodiments of the present disclosure. The diagram 300 depicts a source block 301 and a destination block 303. Source block 301 comprises data corresponding to a number of wordlines: WL 302A, WL 302B, WL 302C, WL 302D, and WL 302*n* of source block 301. It can be appreciated, however, that a block can comprise any n number of wordlines (WLs) in different embodiments. At operation 204B, the processing logic determines that the first subset of the plurality of WLs fails to satisfy the reliability threshold criterion. As described above, in some embodiments this entails a WL having an RBER exceeding the maximum acceptable RBER value. At operation 204C, the processing logic updates a first subset metadata table with information of the first subset. In some embodiments, information of the first subset includes the logical-to-physical address (L2P) information of the physical memory cells associated with the first subset such that the processing logic can perform a media management operation on memory that fails to satisfy the reliability threshold criterion (e.g., the first subset). In some embodiments, the metadata table is stored in a non-volatile memory device (e.g., memory device 130).

At operation 206, the processing logic performs the media management operation on a set of memory cells associated with the first subset. Possible media management operations include "folding." Folding is a media management operation performed by the processing logic involving rearranging and consolidating memory. Folding can be used to "refresh" memory that is causing RD errors, allowing it to be reread and rewritten while erasing problematic memory to mitigate the effects of RD.

In embodiments implementing a folding media management operation, at operation 206A, the processing logic performs a read operation on the set of memory cells associated with the first subset (e.g., from the source block 301 in FIG. 3). At operation 206B, the processing logic performs a write operation on an available set of memory cells (e.g., the destination block 303 in FIG. 3) to write data from the set of memory cells associated with the first subset, wherein the available set of memory cells has not been written to.

Using FIG. 3 to illustrate an example method, at operation 202, the processing logic detects a trigger for the media management operation. In an embodiment, the media management operation is triggered by the source block 301's failure of an RD scan. Once the media management operation is triggered, the processing logic identifies a first subset (e.g., one or more wordlines) of the wordlines associated with the source block 301, where the associated memory cells fail to satisfy a reliability threshold criterion. In some embodiments, this reliability threshold criterion is a maximum raw bit error rate (RBER). In some embodiments, at operation 204A, the first subset of the plurality of wordlines are identified as the processing logic iterates through the wordlines of the source block 301; WL 302A, WL 302B, WL 302C, WL 302D, and WL 302*n*. In some embodiments, (at operation 204B) as the processing logic identifies WL 302B and WL 302D as failing to satisfy the reliability threshold criterion (e.g., WL 302B and WL 302D are of the first subset), the processing logic (at operation 204C) updates the first subset metadata table with information of WL 302B and WL 302D. After the processing logic has identified all the wordlines that fail to meet the reliability threshold criterion (e.g., the wordlines of the first subset), at operation 206, the processing logic performs the media management operation on the first subset. In some embodiments, the system refers to the information (e.g., L2P information) of the first subset metadata table to target each wordline (e.g., WL 302B and WL 302D). As described above, in embodiments implementing a folding media management operation, at operation 206A, the processing logic performs a read operation on the set of memory cells associated with the first subset (e.g., WL 302B and WL 302D) in the source block 301. At operation 206B, the processing logic performs a write operation on an available set of memory cells in the destination block 303 to write data from the set of memory cells associated with the first subset, wherein the available set of memory cells has not been written to. The destination block 303 depicts the data from WL 302B and WL 302D written into the available memory cells. WL 304*n* represents a WL comprising available memory cells (e.g., a WL associated with memory cells that have not been written to).

In some embodiments, at operation 208, the processing logic performs a media management operation on a set of memory cells associated with a second subset of the plurality of WLs, wherein the second subset satisfies the reliability threshold criterion. In some embodiments, a subset satisfying the reliability threshold criterion entails one or more WLs (of the plurality of WLs in the source block 301) having an RBER less than or equal to the maximum acceptable RBER. In FIG. 3, the second subset comprises WL 302A, WL 302C, and WL 302*n*.

In an embodiment implementing a folding media management operation, at operation 208A, the processing logic performs a read operation on the set of memory cells associated with the second subset. At operation 208B, the processing logic performs a write operation on an available set of memory cells to write data from the set of memory cells associated with the second subset, wherein the available set of memory cells has not been written to. In some embodiments, the processing logic writes the data from the set of memory cells associated with the second subset to a different destination block from that of the first subset.

In some embodiments, responsive to determining that there are adequate available memory cells in the destination block of the first subset, the processing logic writes the data from the set of memory cells associated with the second subset (e.g., from source block 301) to the destination block of the first subset (e.g., destination block 303). Responsive to determining that there is not an adequate number of available memory cells in the destination block of the first subset (e.g., there is not enough space in destination block 303 for the data from WL 302A, WL 302C, and WL 302*n*), the processing logic writes the data from the set of memory cells associated with the second subset to a different destination block from that of the first subset.

At operation 210, the processing logic performs an erase operation on the block (e.g., source block 301).

Figure 4:
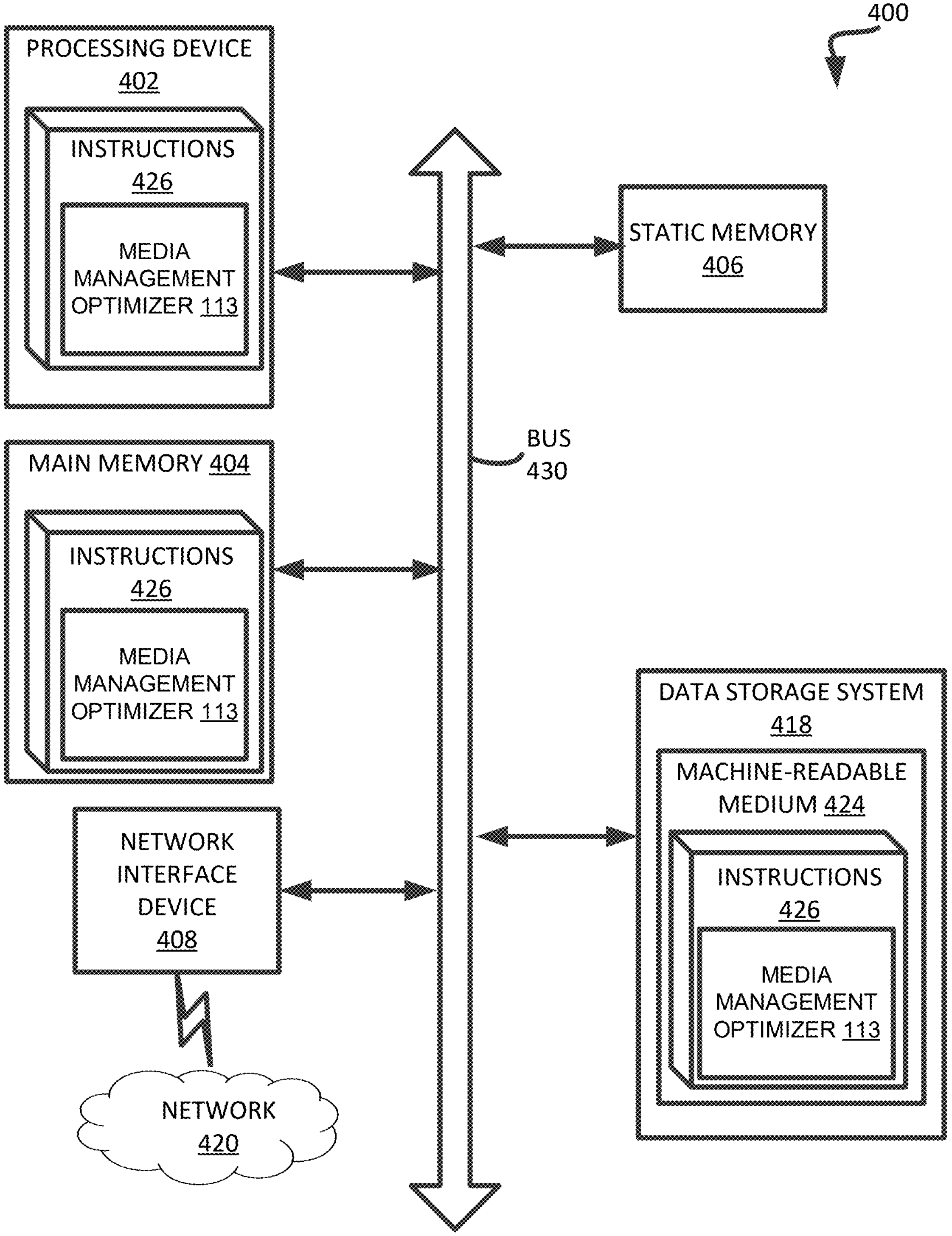
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media management optimizer component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a media management optimizer component (e.g., the media management optimizer component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:

a memory device; and a processing device, operatively coupled with the memory device, to perform operations comprising:

detecting a trigger for a media management operation associated with a block of the memory device, wherein the block comprises a plurality of wordlines (WLs);

identifying a first subset of the plurality of WLs, wherein the first subset of the plurality of WLs fails to satisfy a reliability threshold criterion, wherein identifying the first subset of the plurality of WLs comprises:

iterating through the plurality of WLs;

determining that the first subset of the plurality of WLs fails to satisfy the reliability threshold criterion; and updating a first subset metadata table with information of the first subset, wherein the information of the first subset comprises logical-to-physical (L2P) address information of physical memory cells associated with the first subset; and performing the media management operation on a set of memory cells associated with the first subset using the L2P address information of the first subset metadata table to target each WL of the first subset.

2. The system of claim 1, wherein the trigger for the media management operation comprises determining that the block fails a read disturb (RD) scan.

3. The system of claim 1, wherein the reliability threshold criterion is a maximum raw bit error rate (RBER).

4. The system of claim 1, wherein the media management operation comprises:

performing a read operation on the set of memory cells associated with the first subset; and performing a write operation on an available set of memory cells to write data from the set of memory cells associated with the first subset, wherein the available set of memory cells has not been written to.

5. The system of claim 4, further comprising:

performing a media management operation on a set of memory cells associated with a second subset of the plurality of WLs, wherein the second subset satisfies the reliability threshold criterion, and wherein the media management operation comprises:

performing a read operation on the set of memory cells associated with the second subset; and performing a write operation on an available set of memory cells to write data from the set of memory cells associated with the second subset, wherein the available set of memory cells has not been written to.

6. The system of claim 5, further comprising:

performing an erase operation on the block.

7. The system of claim 1, the set of memory cells is part of a block stripe, wherein the block stripe comprises a logical group of blocks across a plurality of dies.

8. A method comprising:

detecting, by a processing device, a trigger for a media management operation associated with a block of a memory device, wherein the block comprises a plurality of wordlines (WLs);

identifying a first subset of the plurality of WLs, wherein the first subset of the plurality of WLs fails to satisfy a reliability threshold criterion, wherein identifying the first subset of the plurality of WLs comprises:

iterating through the plurality of WLs;

determining that the first subset of the plurality of WLs fails to satisfy the reliability threshold criterion; and updating a first subset metadata table with information of the first subset, wherein the information of the first subset comprises logical-to-physical (L2P) address information of physical memory cells associated with the first subset; and performing the media management operation on a set of memory cells associated with the first subset, using the L2P address information of the first subset metadata table to target each WL of the first subset.

9. The method of claim 8, wherein the trigger for the media management operation comprises determining that the block fails a read disturb (RD) scan.

10. The method of claim 8, wherein the reliability threshold criterion is a maximum raw bit error rate (RBER).

11. The method of claim 8, wherein the media management operation comprises:

performing a read operation on the set of memory cells associated with the first subset; and performing a write operation on an available set of memory cells to write data from the set of memory cells associated with the first subset, wherein the available set of memory cells has not been written to.

12. The method of claim 11, further comprising:

performing a media management operation on a set of memory cells associated with a second subset of the plurality of WLs, wherein the second subset satisfies the reliability threshold criterion, and wherein the media management operation comprises:

performing a read operation on the set of memory cells associated with the second subset; and performing a write operation on an available set of memory cells to write data from the set of memory cells associated with the second subset, wherein the available set of memory cells has not been written to; and performing an erase operation on a block associated with the set of memory cells associated with the second subset.

13. The method of claim 12, further comprising:

performing an erase operation on the block.

14. The method of claim 8, the set of memory cells is part of a block stripe, wherein the block stripe comprises a logical group of blocks across a plurality of dies.

15. A non-transitory computer-readable storage medium comprising instructions that, when executed by a processing device, cause the processing device to perform operations comprising:

detecting a trigger for a media management operation associated with a block of a memory device, wherein the block comprises a plurality of wordlines (WLs);

identifying a first subset of the plurality of WLs, wherein the first subset of the plurality of WLs fails to satisfy a reliability threshold criterion, wherein identifying the first subset of the plurality of WLs comprises:

iterating through the plurality of WLs;

determining that the first subset of the plurality of WLs fails to satisfy the reliability threshold criterion; and updating a first subset metadata table with information of the first subset, wherein the information of the first subset comprises logical-to-physical (L2P) address information of physical memory cells associated with the first subset; and performing the media management operation on a set of memory cells associated with the first subset, using the L2P address information of the first subset metadata table to target each WL of the first subset.

16. The non-transitory computer-readable storage medium of claim 15, wherein the trigger for the media management operation comprises determining that the block fails a read disturb (RD) scan.

17. The non-transitory computer-readable storage medium of claim 15, wherein the reliability threshold criterion is a maximum raw bit error rate (RBER).

* * * * *